US011514210B2

(12) United States Patent
Choi et al.

(10) Patent No.: US 11,514,210 B2
(45) Date of Patent: Nov. 29, 2022

(54) COMPONENT-WISE REDUCED-ORDER MODEL DESIGN OPTIMIZATION SUCH AS FOR LATTICE DESIGN OPTIMIZATION

(71) Applicant: Lawrence Livermore National Security, LLC, Livermore, CA (US)

(72) Inventors: Youngsoo Choi, Livermore, CA (US); Sean Laughlin Mcbane, Austin, TX (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 82 days.

(21) Appl. No.: 16/709,825

(22) Filed: Dec. 10, 2019

(65) Prior Publication Data

US 2021/0173971 A1    Jun. 10, 2021

(51) Int. Cl.
*G06F 30/20*    (2020.01)
*G06F 119/18*   (2020.01)
*G06F 30/23*    (2020.01)

(52) U.S. Cl.
CPC .............. *G06F 30/20* (2020.01); *G06F 30/23* (2020.01); *G06F 2119/18* (2020.01)

(58) Field of Classification Search
CPC ....... G06F 30/20; G06F 30/23; G06F 2119/18
See application file for complete search history.

(56) References Cited

U.S. PATENT DOCUMENTS

| 2010/0262406 | A1* | 10/2010 | Goel | G06F 30/23 |
| | | | | 703/2 |
| 2014/0363481 | A1* | 12/2014 | Pasini | A61F 2/36 |
| | | | | 424/423 |
| 2017/0203516 | A1* | 7/2017 | Vernon | B29C 64/386 |
| 2020/0210629 | A1* | 7/2020 | Benjamin | G06F 30/23 |

OTHER PUBLICATIONS

Nguyen (Nguyen, D. S., & Vignat, F. (Dec. 2016). A method to generate lattice structure for additive manufacturing. In 2016 IEEE international conference on industrial engineering and engineering management (IEEM) (pp. 966-970). IEEE., On the IDS dated Jun. 17, 2020) (Year: 2016).*
Smetana (Smetana, K. (2015). A new certification framework for the port reduced static condensation reduced basis element method. Computer methods in applied mechanics and engineering, 283, 352-383.) (Year: 2015).*

(Continued)

*Primary Examiner* — Bijan Mapar
(74) *Attorney, Agent, or Firm* — Perkins Coie LLP (57) ABSTRACT

Systems and methods for optimizing a lattice structure design are disclosed herein. In some embodiments, a method for optimizing a lattice structure design can include (i) modeling the lattice structure with a component-wise reduced-order model (CWROM) and (ii) optimizing the CWROM based on a selected criterion using a topology optimization algorithm for lattice design. The selected criterion can include a boundary condition and a load applied to the lattice structure. By modeling the lattice structure as a CWROM, the optimization process can be very fast while still permitting the accurate computation of physical quantities of the lattice structure.

17 Claims, 8 Drawing Sheets

(56) References Cited

OTHER PUBLICATIONS

Burgardt (Burgardt, B., & Cartraud, P. (1999). Continuum modeling of beamlike lattice trusses using averaging methods. Computers & structures, 73(1-5), 267-279.) (Year: 1999).*

Achtziger, W., et al., "Equivalent displacement based formulations for maximum strength truss topology design," IMPACT of Computing in Science and Engineering, 4(4):315-345, 1992.

Bendsøe, M., P., "Optimization methods for truss geometry and topology design," Structural optimization, 7(3):141-159, 1994.

Chen, W., et al., "Concurrent topology design of structure and material using a two-scale topology optimization," Computers & Structures, 178:119-128, 2017.

Eftang, L., J., et al., "Port reduction in parametrized component static condensation: approximation and a posteriori error estimation," International Journal for Numerical Methods in Engineering, 96(5):269-302, 2013.

Huynh, et al. "A static condensation reduced basis element method: approximation and a posteriori error estimation," ESAIM: Mathematical Modelling and Numerical Analysis, 47(1):213-251, 2013.

Mela, L., "Resolving issues with member buckling in truss topology optimization using a mixed variable approach," Structural and Multidisciplinary Optimization, 50(6):1037-1049, 2014.

Stolpe, M., "Truss optimization with discrete design variables: a critical review," Structural and Multidisciplinary Optimization, 53(2):349-374, 2016.

Wang, C., et al., "Concurrent topology optimization design of structures and non-uniform parameterized lattice microstructures," Structural and Multidisciplinary Optimization, 58(1):35-50, 2018.

Watts, S., et al., "Simple, accurate surrogate models of the elastic response of three-dimensional open truss micro-architectures with applications to multiscale topology design," Structural and Multidisciplinary Optimization, pp. 1-34, 2019.

White, D., et al., "Multiscale topology optimization using neural network surrogate models," Computer Methods in Applied Mechanics and Engineering, 346:1118-1135, 2019.

* cited by examiner

COMPONENT-WISE REDUCED-ORDER MODEL DESIGN OPTIMIZATION SUCH AS FOR LATTICE DESIGN OPTIMIZATION

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

TECHNICAL FIELD

The present technology generally relates to systems and methods for optimizing the design of lattice structures.

BACKGROUND

It is often desirable to fabricate lattice structures having an optimized design for a particular application. For example, optimal lattice structures are often desirable for orthopedic implants and scaffolds for tissue regeneration to ensure (i) cell attachment and growth, (ii) biocompatibility, and (iii) mechanical strength. Additionally, in the automotive and aerospace industries, optimized lattice structures can be used as an alternative to traditional metallic and composite structures to reduce weight and save fuel. Likewise, optimized lattice structures can be incorporated into shoes, helmets, and other products to reduce weight while maintaining desired structural characteristics.

The most accurate way of modeling a lattice structure is to use continuum solid finite elements that provide robust physical information about the structure. However, such finite element modeling introduces many degrees of freedom that greatly slow the computational design optimization process. In particular, design optimization processes often require many high-fidelity simulations of a parameter space, which is even more computationally expensive than running a single simulation. Accordingly, some current software applications for modeling lattice designs reduce the number of degrees of freedom in a model by making simplifying assumptions. Such techniques include homogenization-based modeling methods and beam/truss element-based modeling methods.

More specifically, homogenization-based modeling methods typically include: (i) designing a unit cell using a high-fidelity computational model, (ii) homogenizing the unit cell, and (iii) designing a macro-level structure including a plurality of the unit cells using a continuum topology optimization algorithm. The homogenization step assumes infinitesimal periodic boundary conditions and maps the response of the high-fidelity computational model of the unit cell to an element elasticity tensor. Therefore, such homogenization methods cannot provide physics information in greater detail than the order of the finite element used to represent each unit cell. Moreover, the infinite periodic boundary conditions do not reflect real boundary conditions on an external surface. Additionally, the length scale of the unit cell must be much smaller than the system length scale or the accuracy of the homogenization method will be very low. Moreover, homogenization methods are limited to a uniform microstructure lattice (e.g. that of only an octet truss), and only the relative volume fractions of the unit cells can be varied in space.

Beam/truss element-based modeling methods directly design for macro-level structures by starting with an underlying design domain that is composed of many beam/truss elements. This approach allows a flexible design domain, such as a functionally-graded lattice structure. A beam/truss element is a reduced representation for continuum solid finite elements of a strut under the assumption that the length of the strut is much larger than the cross-sectional area. Therefore, the computational cost of beam/truss elements is very cheap. Loads and boundary conditions are applied to the underlying design domain and an optimization algorithm removes unnecessary beams/trusses and thickens or shrinks the cross-sectional areas to obtain an optimal design. However, it is well known that beam/truss elements cannot accurately model the stress at the joints between struts. Additionally, the assumption of a high length to cross-sectional area aspect ratio of the struts is often violated. Thus, beam/truss element-based modeling methods are computationally fast, but relatively inaccurate.

In summary, both homogenization-based and beam/truss element-based modelling methods accelerate the lattice design procedure by approximating high fidelity continuum finite element models as unit cells or struts, respectively, but both fail to achieve the accuracy that is crucial for a robust design, such as stress-constrained design problems.

DETAILED DESCRIPTION

The present technology is generally directed to methods and systems for optimizing a lattice structure design. The lattice structure design can be for a macro-level object that is designed using many micro-level struts, joints, unit cells, and/or other types of micro-level structures. For example, the lattice structure design could be for a medical device such as an orthopedic implant (e.g., hip implant) or scaffold for tissue regeneration. Likewise, the lattice structure design can be for an aerospace or automobile part, such as the body of an unmanned aerial vehicle (UAV), the frame of a bike or automobile, a piston, a gear, etc. The optimization methods of the present technology ensure that the lattice structure design meets selected criteria such as strength, rigidity, etc., while also minimizing the weight and material used in the design.

In general, a method for optimizing a lattice structure design can include (i) modeling the lattice structure with a component-wise reduced-order model (CWROM) and then (ii) optimizing the CWROM based on a selected criterion using a topology optimization algorithm for lattice design. In some embodiments, the method can further include applying a port reduction (e.g., a static condensation technique) to the CWROM. In one aspect of the present technology, modeling the lattice structure as a CWROM and applying a port reduction to the CWROM greatly reduce the number of degrees of freedom in the model while still permitting the computation of high-fidelity physical information about the lattice structure. Accordingly, the present technology offers a large speed-up in the computational design optimization process compared to continuum finite element modeling techniques, as well as greater accuracy compared to conventional homogenization-based and beam/truss element-based methods that accelerate the lattice design procedure by approximating high fidelity continuum finite element models as unit cells or struts, respectively. For example, the CWROM techniques of the present technology can accurately compute the stress contours at the joints between components in the lattice structure.

More specifically, in some embodiments a method for optimizing a lattice structure design can include modeling a plurality of lattice components as finely-discretized numerical meshes or other high-fidelity models. The lattice components can comprise two-dimensional or three-dimensional joints, struts, unit cells, and/or other components. The method further includes (i) generating a reduced-order model for each of the lattice components, and (ii) assembling the reduced-order models of multiple ones of the lattice components to form a CWROM which represents an interconnected, macro-level lattice structure. The lattice structure can include, for example, a plurality of interconnected struts and joints that together define a design domain. The method can further include assigning a design variable to each of the lattice components in the lattice structure. The design variable can include at least one of a density, shape, and position of the corresponding lattice component. Finally, the method can include optimizing, based on a selected criterion, the design variable for each of the lattice components in the lattice structure. The selected criterion can include a boundary condition and/or force applied to the lattice structure. As one example, where the lattice structure design is for an aerospace part, the design variable can be a density and the selected criterion can include the anticipated forces/loads on the part during operation. Thus, the part can be manufactured to withstand the forces during operation while also minimizing the weight of the part.

Specific details of several embodiments of the present technology are described herein with reference to FIGS. 1-6. However, the present technology may be practiced without some of these specific details. In some instances, well-known structures and techniques often associated with reduced-order modeling, design optimization algorithms, lattice component modeling, etc., have not been shown/described in detail so as not to obscure the present technology. The terminology used in the description presented below is intended to be interpreted in its broadest reasonable manner, even though it is being used in conjunction with a detailed description of certain specific embodiments of the disclosure. Certain terms may even be emphasized below; however, any terminology intended to be interpreted in any restricted manner will be overtly and specifically defined as such in this Detailed Description section.

Figure 1:
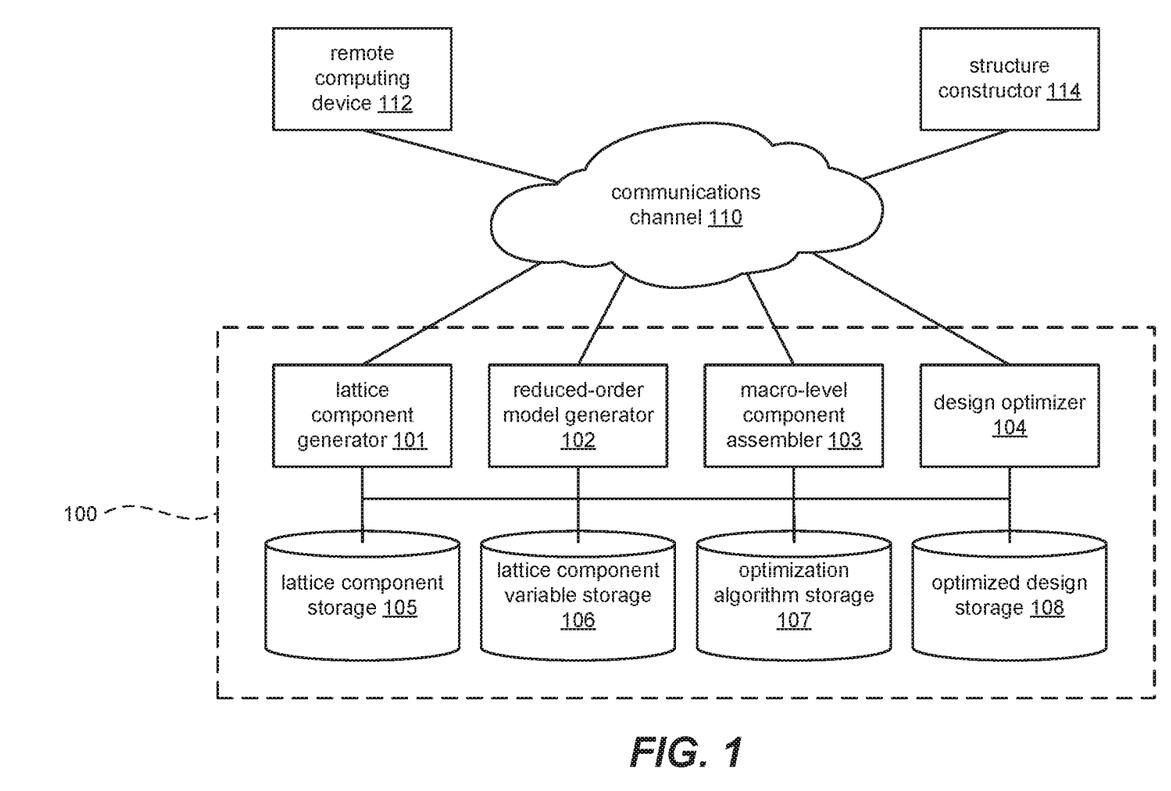
FIG. 1 is a block diagram that illustrates components of a lattice structure design optimization system in accordance with some embodiments of the present technology.

FIG. 1 is a block diagram that illustrates components of a lattice structure design optimization system 100 ("system 100") in accordance with some embodiments of the present technology. The system 100 can include computer-implemented components such as a lattice component generator 101, a reduced-order model generator 102, a macro-level/system-level component assembler 103, and a design optimizer 104. The system 100 also includes various storages operably coupled to one or more of the computer-implement components 101-104 such as a lattice component storage 105, a lattice component variable storage 106, an optimization algorithm storage 107, and an optimized design storage 108. In some embodiments, the system 100 can interface with one or more remote computing devices 112 and/or one or more structure constructors 114 via a communications channel 120.

The lattice component generator 101 can allow a user to build one or more (e.g., micro-level) lattice components for inclusion in a macro-level lattice design. The lattice components can be two-dimensional or three-dimensional joints, struts, beams, trusses, unit cells (e.g., rhombic dodecahedrons, isotrusses, octet trusses, etc.), or other suitable components, and can have any selected shape or size. In some embodiments, the lattice components can be modeled as finely-discretized numerical mesh structures having a selected number of degrees of freedom. The lattice components are stored in the lattice component storage 105. In some embodiments, the lattice component storage 105 defines a library of lattice components that can be selected (e.g., by a user entity) for inclusion in a macro-level lattice design.

The reduced-order model generator 102 is configured to generate reduced-order models for one or more of the lattice components. The reduced-order models for the lattice components can include a reduced number of degrees of freedom and can be stored in the lattice component storage 105.

The macro-level component assembler 103 is configured to generate (e.g., assemble, build, etc.) a macro-level lattice structure from one or more of the lattice components. In some embodiments, the macro-level component assembler 103 allows a user entity to define a macro-level lattice structure having a specified shape and size. The macro-level lattice structure can be a two-dimensional or three-dimensional structure that defines a design domain. The macro-level component assembler 103 can further (i) generate a design-optimization variable for each of the components in the macro-level structure and (ii) store the design-optimization variable for each of the lattice components in the lattice component variable storage. The design-optimization variable can be a density, a shape, a position, and/or another physical characteristic of each of the lattice components within the macro-level lattice structure.

The design optimizer 104 is configured to solve a design optimization problem for the macro-level lattice structure to generate an optimized lattice design. In some embodiments, the design optimizer 104 allows a user entity to define a selected criterion for the optimization problem that includes, for example, various boundary conditions, stress profiles, load profiles, force profiles, maximum stress levels, compliances, selected weights/masses of the optimized lattice design, temperature profiles (e.g., maximum or average temperatures), etc. More generally, the selected criterion can comprise one or more external sources (e.g., structural or thermal quantities) acting on the lattice structure. The design optimizer 104 can then solve the design optimization problem using one or more optimization algorithms stored in the optimization algorithm storage 107. The solution to the design optimization problem (e.g., an optimized lattice design) can be stored in the optimized design storage 108.

In some embodiments, the system 100 can output an optimized lattice design to the structure constructor 114 via the communications channel 110, and the structure constructor 114 can physically manufacture the design. For example, the structure constructor 114 can be an additive manufacturing system (e.g., three-dimensional printer) configured to additively build the specified lattice structure.

The computing devices and systems on which the system 100 may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the system 100. The data transmission media is used for transmitting data via transitory, propagating signals or carrier waves (e.g., electromagnetism) via a wired or wireless connection.

The system 100 may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the system may be implemented in hardware using, for example, an application-specific integrated circuit ("ASIC").

Figure 2:
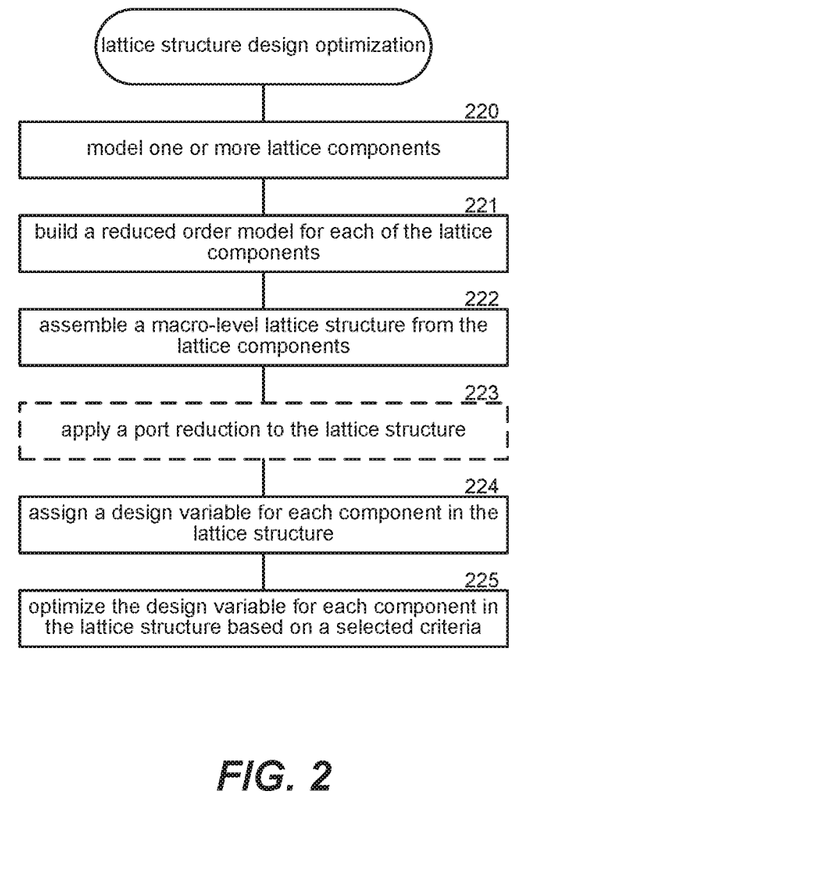
FIG. 2 is a flow diagram that illustrates the overall processing and operation of a lattice structure design optimization system in accordance with some embodiments of the present technology.

FIG. 2 is a flow diagram that illustrates the overall processing and operation of a lattice structure design optimization system in accordance with some embodiments of the present technology. Aspects of the processing and operation are described in the context of the system 100 shown in FIG. 1 although, in other embodiments, some or all of the processing can be carried out in other suitable systems.

Figure 3A:
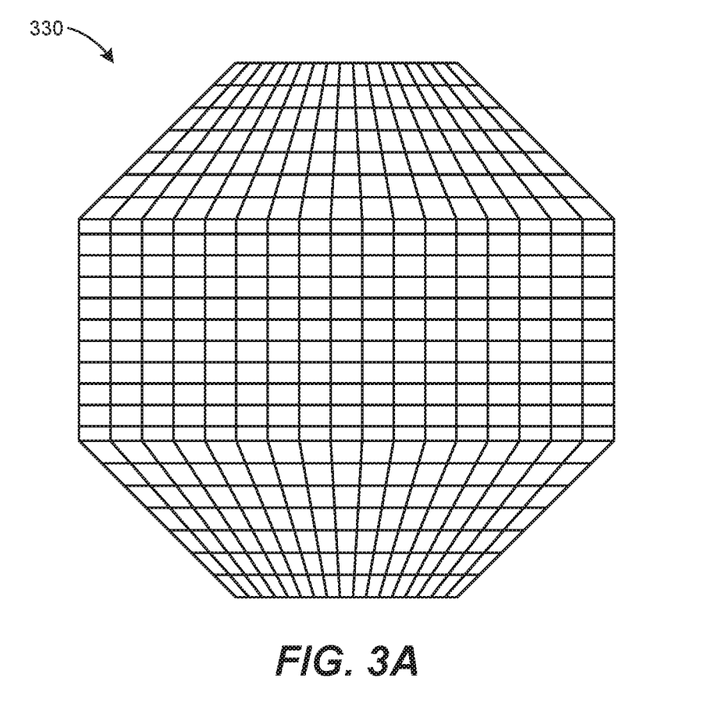
FIGS. 3A and 3B are schematic illustrations of a joint-type lattice component and a strut-type lattice component, respectively, in accordance with some embodiments of the present technology.
Figure 3B:
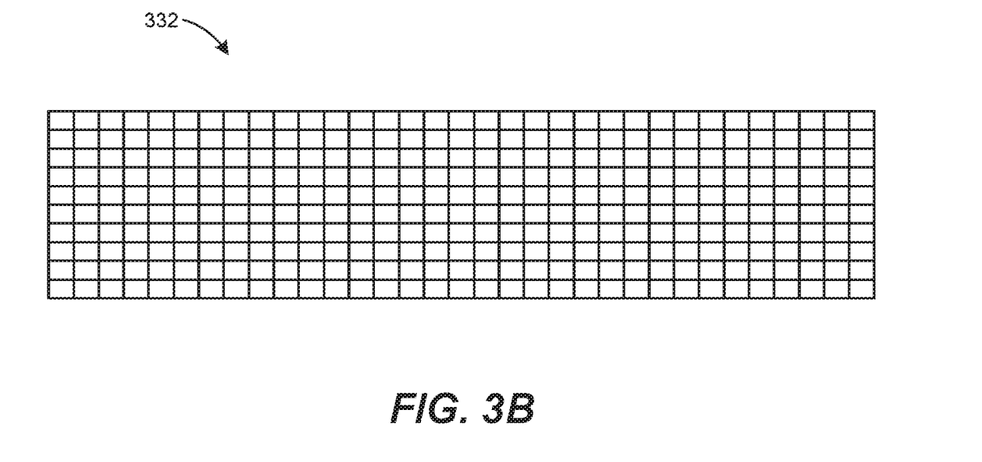

In block 220, the lattice component generator 101 builds/generates one or more lattice components. In some embodiments, the lattice components are micro-level components having, for example, dimensions in the range of about 10 µm to 1000 µm. The lattice components can include one or more of struts, beams, trusses, unit cells (e.g., rhombic dodecahedrons, isotrusses, octet trusses, etc.), and can be two- or three-dimensional. For example, FIGS. 3A and 3B are schematic illustrations of a joint component 330 (e.g., a first lattice component) and a strut component 332 (e.g., a second lattice component), respectively, in accordance with some embodiments of the present technology. Referring to FIGS. 3A and 3B together, the joint component 330 can have a generally octagonal two-dimensional shape and the strut component 332 can have a generally rectangular two-dimensional shape. In other embodiments, the joint and strut components 330 and 332 can have different shapes and/or relative sizes. In the illustrated embodiment, the joint and strut components 330 and 332 are built/modeled as finely-discretized numerical meshes having a selected number of degrees of freedom. In other embodiments, the lattice components can be built/modeled in another suitable manner.

In block 221, the reduced-order model generator 102 generates a reduced-order model for each of the lattice components (e.g., for the joint component 330 and the strut component 332). The reduced-order model of each of the lattice components reduces the number of degrees of freedom in the model for the component while still retaining high-fidelity physical information. In some embodiments, the reduced-order model for each of the lattice components can be built as matrix. In block 222, the macro-level component assembler 103 assembles a macro-level lattice structure from the individual (e.g., micro-level) lattice components. More particularly, the macro-level component assembler 103 generates a component-wise reduced-order model (CWROM) for the macro-level lattice structure by combining/assembling the reduced-order models for a plurality of the lattice components. In one aspect of the present technology, the CWROM technique implemented by the reduced-order model generator 102 and the macro-level component assembler 103 is different from a classical model order reduction because the training is done at the component level. In some embodiments, the reduced-order model generator 102 and/or the macro-level component assembler 103 can employ techniques for generating a CWROM as described in Dinh Bao Phuong Huynh, David J. Knezevic, and Anthony T. Patera. *A static condensation reduced basis element method: approximation and a posteriori error estimation*. ESAIM: Mathematical Modelling and Numerical Analysis, 47(1):213-251, 2013, which is incorporated herein by reference in its entirety.

Figure 4:
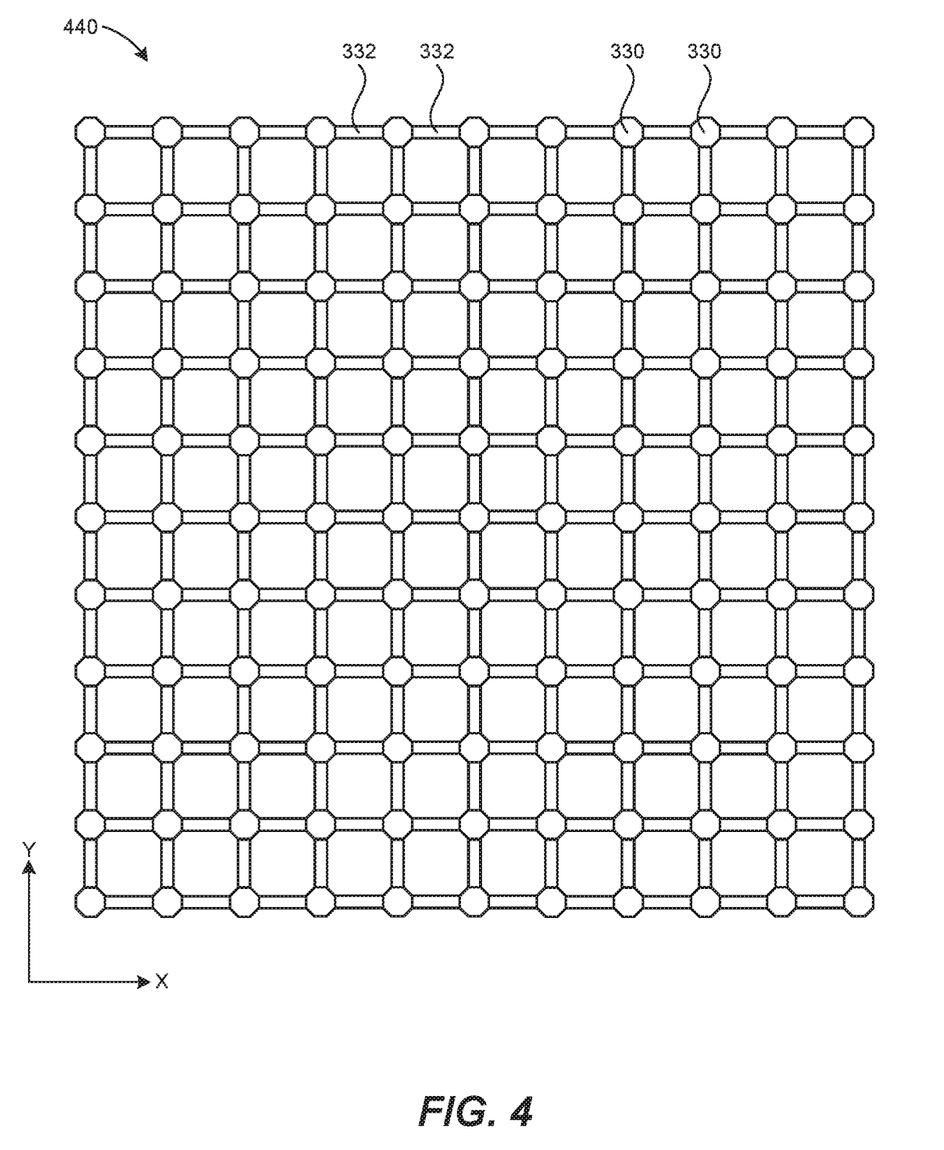
FIG. 4 is a schematic illustration of a macro-level lattice structure assembled from a plurality of the joint components and the strut components shown in FIGS. 3A and 3B in accordance with some embodiments of the present technology.

FIG. 4, for example, is a schematic illustration of a macro-level lattice structure 440 ("structure 440") assembled from a plurality of the joint components 330 and the strut components 332 shown in FIGS. 3A and 3B. In the illustrated embodiment, the joint components 330 are arranged in a grid-pattern and individual ones of the strut components 332 extend between adjacent pairs of the joint components 330. The dimensions of the structure 440 and the number and position of the joint components 330 and the strut components 332 can be varied to provide a different design domain (e.g., for different applications). Likewise, the structure 440 can be a three-dimensional structure rather than the illustrated two-dimensional structure and can include more than two different types of lattice components. In some embodiments, the macro-level component assembler 103 allows a user entity to define the structure 440 by choosing the dimensions, components, pattern, and/or other characteristic of the structure 440. The structure 440 defines a design domain in which one or more variables of the lattice components can be optimized for a particular design application, as described in greater detail below.

In some embodiments, the CWROM of the structure 440 can comprise (i) a plurality of "interface functions" that model the interfaces between adjacent ones of the joint components 330 and the strut components 332 and (ii) a plurality of "bubble functions" that model the interior of the joint components 330 and the strut components 332. The CWROM can be assembled by assembling the local matrices for each of the joint components 330 and the strut components 332 as a global sparse system and mapping the local degrees of freedom to global degrees of freedom. In one aspect of the present technology, the assembly of local matrices is completely independent. In another aspect of the present technology, the local matrices for each of the components in the structure 440 can be precomputed (e.g., in block 221). That is, each of the components in the structure 440 is already trained/modeled in block 221 (e.g., modeled as a reduced-order model by a CWROM technique) such that the structure 440 does not need to be trained at the macro-level. Accordingly, if the configuration (e.g., dimensions, shape, etc.) of the structure 440 changes, the various components of the structure 440 do not need to be re-trained. Thus, any system that can be assembled with the modeled lattice components can be used as an underlying design domain, implying no need for re-training even though the system has been changed. In another aspect of the present technology, such component-wise training is computationally cheaper/simpler than macro-level training.

Optionally in block 223, the system 100 can apply a port reduction to the CWROM of the macro-level lattice structure 440 to further reduce the degrees of freedom in the CWROM, thereby reducing the computational size of the CWROM of the structure 440. More specifically, a port can refer to the interface between adjacent components in a macro-level lattice structure, and a port reduction technique can reduce the degrees of freedom between each pair of adjacent components. In some embodiments, for example, a static condensation technique can be applied to the interface degrees of freedom in the CWROM where each of the joint components 330 and the strut components 332 are joined together. In some embodiments, the system 100 can employ a port reduction technique as described in Jens L. Eftang and Anthony T. Patera. *Port reduction in parametrized component static condensation: approximation and a posteriori error estimation*. International Journal for Numerical Methods in Engineering, 96(5):269-302, 2013, which is incorporated herein by reference in its entirety.

In block 224, the design optimizer 104 assigns one or more design variables to each of the lattice components in the structure 440. The design variables correspond to physical parameters of the components in the structure 440 that are to be optimized. In some embodiments, the design variables can include one or more of a density, size, shape, and position (e.g., along an x-axis and y-axis of the structure 440 shown in FIG. 4) of the components.

In block 225, the design optimizer 104 optimizes the design variables for each of the components in the structure 440 based on a selected criterion. The selected criterion can include one or more physical conditions for which the structure 440 is to be optimized (e.g., external sources acting on the structure 440) such as, for example, an external force (a linear or non-linear pressure, stress, or load force), a stress condition, a selected mass for the optimized design (e.g., a maximum mass), boundary conditions, temperatures, and/or other suitable physical characteristics or quantities. In some embodiments, the design optimizer 104 can employ a topology optimization algorithm to optimize the structure 440, such as a method of moving asymptotes (MMA), interior point optimizer (IPOPT) method, sparse nonlinear optimizer (SNOPT) method, and/or other gradient-based optimization solver. That is, the design optimizer 104 can solve the optimization problem for the structure 440 based on the selected criterion to generate an optimized lattice design.

More specifically, in some embodiments the design optimizer 104 can find the solution for the CWROM represented by sums of the interface functions and the bubble functions of the CWROM. The interface functions are a basis for the interfaces between components and extend to the whole component domain, while the bubble functions ensure the governing equations are satisfied in the interior of each of the components.

Figure 5A:
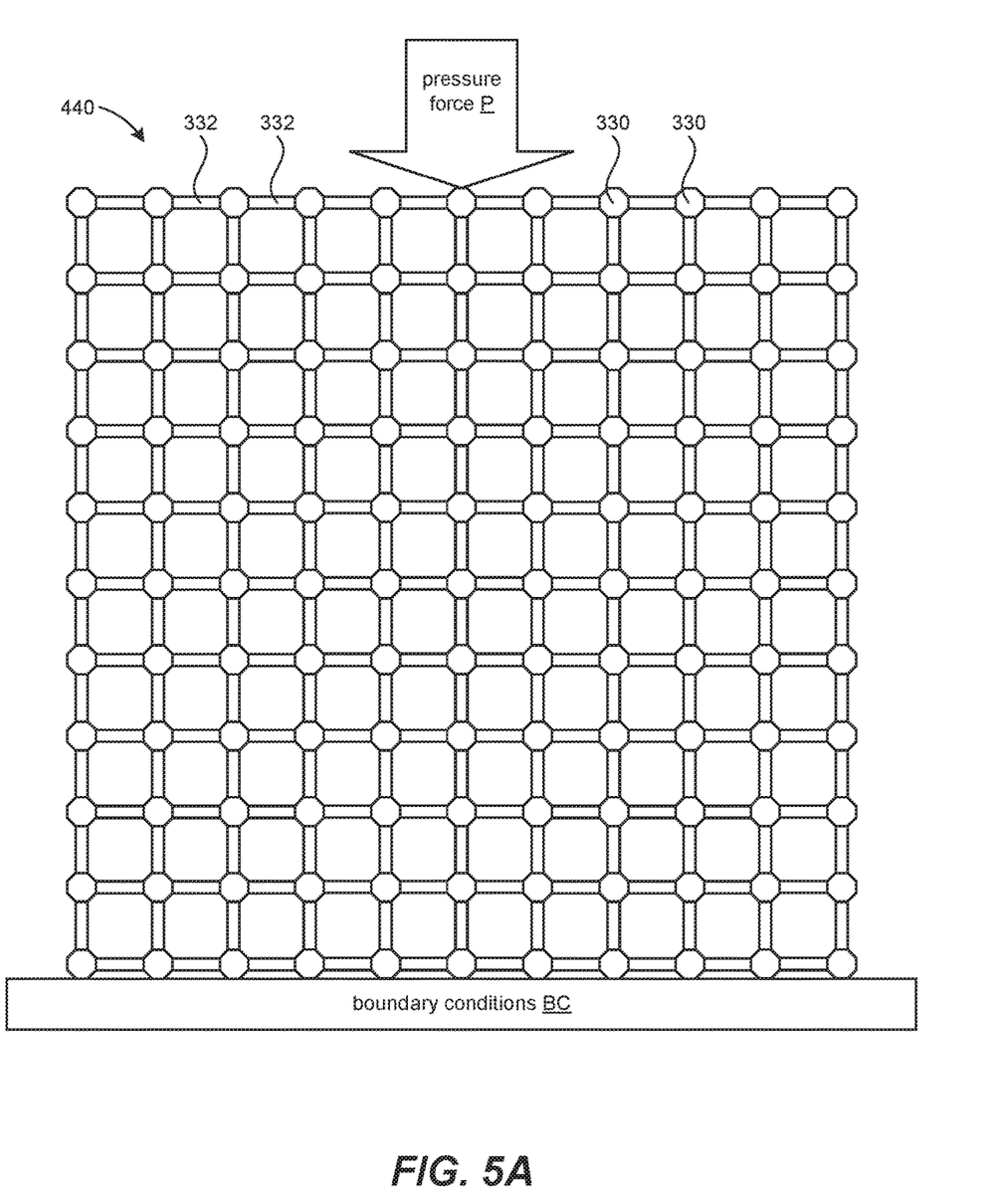
FIGS. 5A-5C are schematic illustrations of various stages of a procedure for optimizing the macro-level lattice structure of FIG. 4 in accordance with some embodiments of the present technology.
Figure 5B:
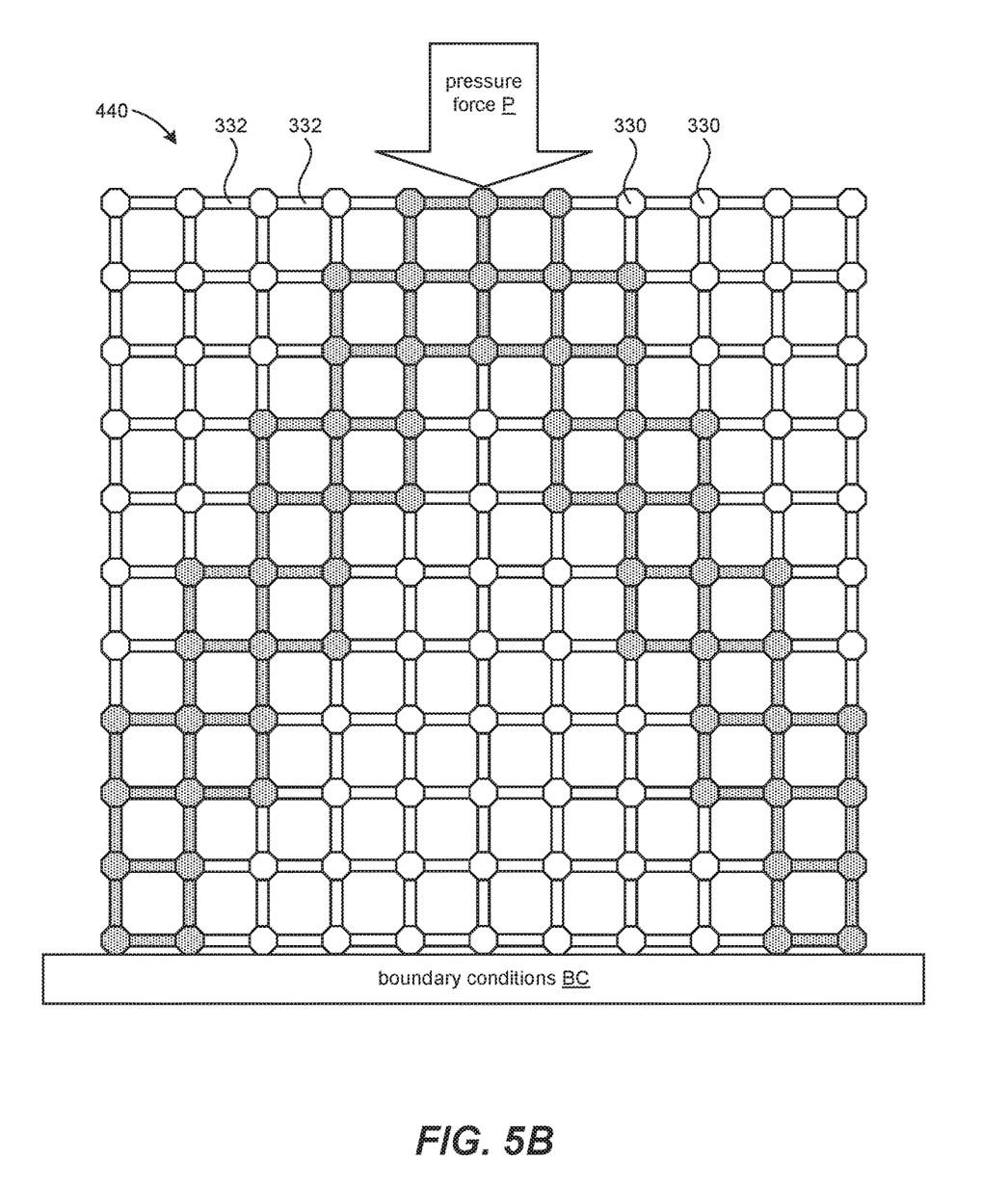
Figure 5C:
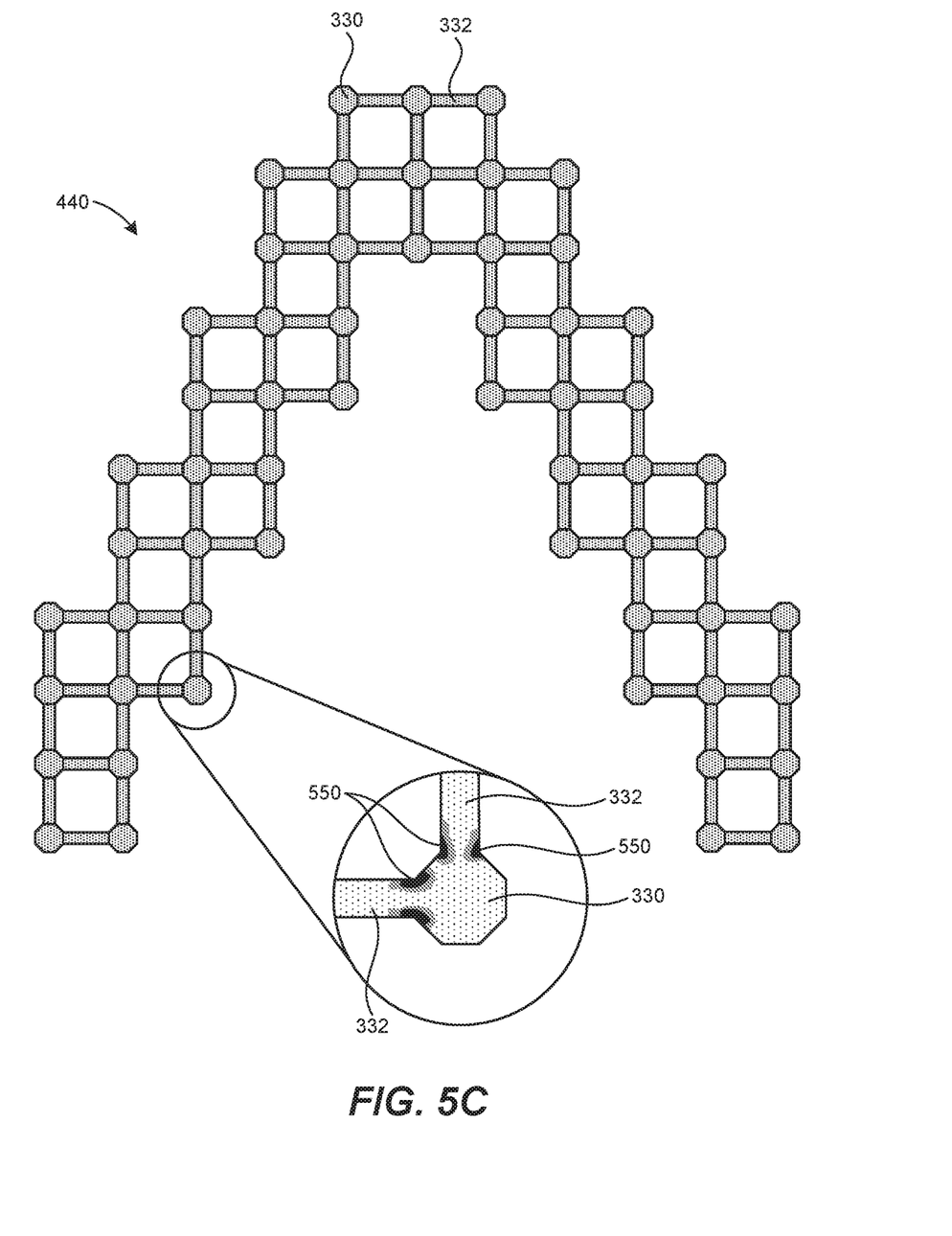

FIGS. 5A-5C, for example, are schematic illustrations of various stages of a procedure for optimizing a density of the joint components 330 and the strut components 332 of the structure 440 based on a selected criterion including (i) a pressure force P applied to the structure 440 and (ii) boundary conditions BC applied to the structure 440. Referring to FIG. 5A, in the illustrated embodiment the pressure force P and the boundary conditions BC (e.g., Dirichlet boundary conditions) are applied to opposing sides of the structure 440. Referring next to FIG. 5B, the design optimizer 104 optimizes the densities of the joint components 330 and the strut components 332 based on the pressure force P and the boundary conditions BC. The shaded ones of the joint components 330 and the strut components 332 in FIG. 5B illustrate the optimized design for the selected criterion of the pressure force P and the boundary conditions BC. More specifically, the shaded ones of the joint components 330 and the strut components 332 represent those components that have been assigned a non-zero density, while the non-shaded ones of the joint components 330 and the strut components 332 represent those components that have been assigned a zero-density. In some embodiments, the design optimizer 104 can assign a discrete density to each of the components (e.g., zero density or full density) while, in other embodiments, the density optimization can be continuous. Accordingly, the design optimizer 104 can thicken, shrink, or even remove the joint components 330 and the strut components 332 to provide an optimal structure for the selected criterion.

In some embodiments, the optimized solution for the structure 440 is a high-fidelity solution that can be post-processed to compute physical quantities of interest, such as von Mises stresses. For example, FIG. 5C illustrates the final optimized design of the structure 440, and provides an enlarged schematic illustration of the interface between one of the joint components 330 and the strut components 332 attached thereto. As shown, the system 100 can compute stress contours 550 at the interfaces between the joint components 330 and the strut components 332. Specifically, the system 100 can accurately compute stresses throughout the structure 440 because the reduced-order model for each of the joint components 330 and the strut components 332 is based on a continuum theory. In contrast, conventional modeling techniques such as beam/truss element-based modelling methods are unable to model the stress at the joints between components.

In one aspect of the present technology, the system 100 can compute an optimized design very quickly because the components in the macro-level structure are modeled component-wise by reduced-order models. This CWROM-based lattice design approach offers a large speed-up in the computational process (relative to continuum finite element methods) and arbitrary, tunable accuracy in the analysis. For example, it is expected that the system 100 can compute an optimal design at least 600 times faster than a complete finite element model, and at least 70 times faster than a full-order component-wise model, while providing similar relative accuracy.

Additionally, the system 100 can compute physical quantities of interest (e.g., von Mises stresses) with similar accuracy to corresponding high-fidelity continuum finite element models. For example, when stress-constrained optimization problem are solved, more meaningful stress values can be obtained by the CWROM-based approach as compared to conventional homogenization-based or beam/truss element-based modeling techniques. Therefore, the system 100 can optimize a design using a lower stress constraint upper bound compared to the homogenization-based and beam/truss element-based modelling methods. This implies that a lighter or more optimal design can be obtained by the CWROM-based approach of the present technology.

In another aspect of the present technology, the CWROM-based lattice design optimization techniques of the present technology provide for natural parallel domain decomposition formulation, meaning that the optimal implementation allows for very good parallel scalability.

Figure 6:
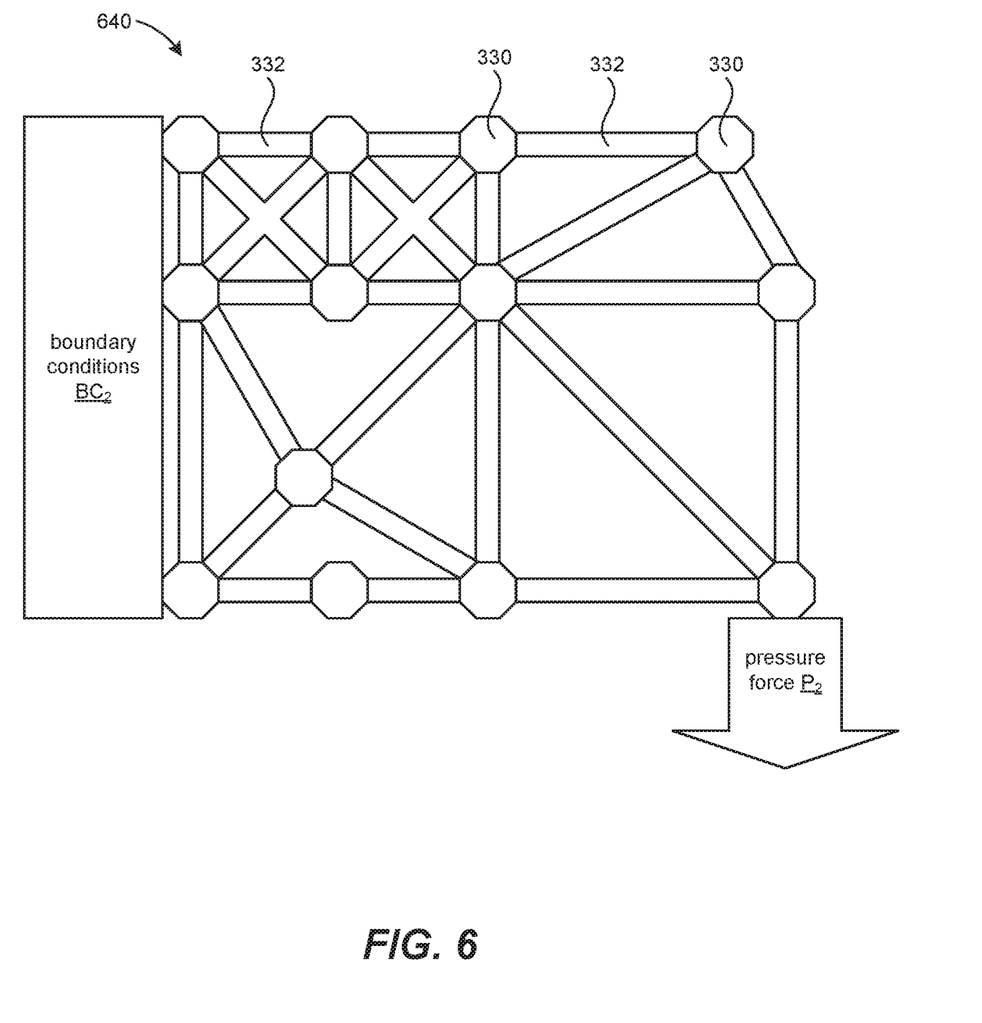
FIG. 6 is a schematic illustration of a macro-level lattice structure assembled from a plurality of the joint components and the strut components shown in FIGS. 3A and 3B in accordance with another embodiment of the present technology.

FIG. 6 is a schematic illustration of a macro-level lattice structure 640 assembled from a plurality of the joint components 330 and the strut components 332 and optimized by the system 100 based on a selected criterion including a pressure force $P_2$ and boundary conditions $BC_2$ applied to the structure 640 in accordance with another embodiment of the present technology. In the illustrated, the design variable for optimization includes the location of the joint components 330 along the structure 640 and the size (e.g., length) of the strut components 332. In the optimized design, the joint components 330 and the strut components 332 are not uniformly positioned along the structure 640. As one of ordinary skill in the art will appreciate, the final, optimized design of the structure 640 can have any suitable configuration based on the design variables to be optimized and the optimization criterion.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method performed by one or more computing systems for optimizing a lattice structure design, the method comprising:
   modeling a plurality of individual lattice components as numerical meshes;
   generating a reduced-order model for each of the individual lattice components;
   after generating the reduced-order model for each of the individual lattice components, generating a component-wise reduced-order model (CWROM) of a lattice structure by assembling multiple ones of the reduced-order models for the lattice components;
   optimizing, based on a selected criterion, the CWROM using a topology optimization algorithm, wherein optimizing the CWROM includes optimizing a design variable for each of the lattice components in the lattice structure; and
   outputting the lattice structure and the optimized design variables to a structure constructor, wherein the structure constructor is configured to physically manufacture the lattice structure based on the optimized design variables.

2. The method of claim 1 wherein the lattice components include a first lattice component and a second lattice component different than the first lattice component, and wherein generating the CWROM includes:
   assembling the reduced-order models for a plurality of the first lattice components and a plurality of the second lattice components.

3. The method of claim 2 wherein the first lattice component is a joint, and wherein the second lattice component is a strut.

4. The method of claim 2 wherein modeling the plurality of individual lattice components as numerical meshes includes:
   modeling the first lattice component as a numerical mesh before generating the reduced-order model of the first lattice component; and
   modeling the second lattice component as a numerical mesh before generating the reduced-order model of the second lattice component.

5. The method of claim 1 wherein the design variable is at least one of a density, a shape, and a position of the corresponding lattice component.

6. The method of claim 1 wherein the lattice structure is three-dimensional.

7. The method of claim 1 wherein the method further comprises applying a port reduction to the CWROM before optimizing the CWROM based on the selected criterion.

8. The method of claim 1 wherein the selected criterion includes (a) a boundary condition for the lattice structure and (b) an external source acting on the lattice structure.

9. The method of claim 1 wherein the topology optimization algorithm is at least one of a method of moving asymptotes, an interior point optimizer method, and a sparse nonlinear optimizer method.

10. One or more computing systems for optimizing a lattice structure design, the one or more computing systems comprising:

one or more computer-readable storage mediums for storing computer-executable instructions for controlling the one or more computing systems to—model a plurality of individual lattice components as numerical meshes;
generate a reduced-order model for each of the individual lattice components;
after generating the reduced-order model for each of the individual lattice components, generate a component-wise reduced-order model (CWROM) of a lattice structure by assembling multiple ones of the reduced-order models for the lattice components;
optimize, based on a selected criterion, the CWROM using a topology optimization algorithm, wherein optimizing the CWROM includes optimizing a design variable for each of the lattice components in the lattice structure; and
output the lattice structure and the optimized design variables to a structure constructor, wherein the structure constructor is configured to physically manufacture the lattice structure based on the optimized design variables; and
one or more processors for executing the computer-executable instructions stored in the one or more computer-readable storage mediums.

11. The one or more computing systems of claim 10 wherein the lattice components include a first lattice component and a second lattice component different than the first lattice component, and wherein the computer-executable instructions for generating the CWROM are for controlling the one or more computing systems to:
assemble the reduced-order models for a plurality of the first lattice components and a plurality of the second lattice components.

12. The one or more computing systems of claim 11, wherein the computer-executable instructions modeling the plurality of individual lattice components as numerical meshes are for controlling the one or more computing systems to:
model the first lattice component as a numerical mesh before generating the reduced-order model of the first lattice component;
model the second lattice component as a numerical mesh before generating the reduced-order model of the second lattice component; and
apply a port reduction to the CWROM before optimizing the CWROM.

13. The one or more computing systems of claim 11 wherein the computer-executable instructions are for further controlling the one or more computing systems to store the generated reduced-order models for the first and second lattice components in a storage location.

14. The one or more computing systems of claim 11 wherein the first lattice component is a joint, wherein the second lattice component is a strut, and wherein the selected criterion includes (a) a boundary condition for the lattice structure and (b) an external source acting on the lattice structure.

15. The one or more computing systems of claim 10 wherein the design variable is a at least one of a density, a shape, and a position of the lattice components.

16. A method performed by one or more computing systems for optimizing a lattice structure design, the method comprising:
modeling a plurality of micro-level lattice components as numerical meshes;
generating a reduced-order model for each of the lattice components;
after generating the reduced-order model for each of the lattice components, generating a component-wise reduced-order model (CWROM) of a macro-level lattice structure from multiple ones of the reduced-order models for the lattice components;
assigning a design variable to each of the lattice components in the lattice structure, wherein the design variable includes at least one of a density, a shape, and a position of the corresponding lattice component;
optimizing, based on a selected criterion, the design variable for each of the lattice components in the lattice structure; and
outputting the lattice structure and the optimized design variables to a structure constructor, wherein the structure constructor is configured to physically manufacture the lattice structure based on the optimized design variables.

17. The method of claim 16 wherein the lattice structure includes a plurality of interfaces at the interconnections between adjacent ones of lattice components, and wherein the method further comprises applying a static condensation technique to the CWROM to reduce the degrees of freedom at the interfaces.

* * * * *